H. FRANZ.
Manufacture of Glassware.

No. 220,822.  Patented Oct. 21, 1879.

Witnesses.
James K. Bakewell
John K. Smith

Inventor.
Henry Franz
by Bakewell & Kerr
Attorneys

UNITED STATES PATENT OFFICE.

HENRY FRANZ, OF PITTSBURG, PENNSYLVANIA, ASSIGNOR TO CAMPBELL, JONES & CO., OF SAME PLACE.

IMPROVEMENT IN MANUFACTURE OF GLASSWARE.

Specification forming part of Letters Patent No. 220,822, dated October 21, 1879; application filed September 8, 1879.

*To all whom it may concern:*

Be it known that I, HENRY FRANZ, of Pittsburg, in the county of Allegheny and State of Pennsylvania, have invented a new and useful Improvement in the Manufacture of Glassware; and I do hereby declare the following to be a full, clear, and exact description thereof, reference being had to the accompanying drawings, forming a part of this specification, in which—

Figure 1:
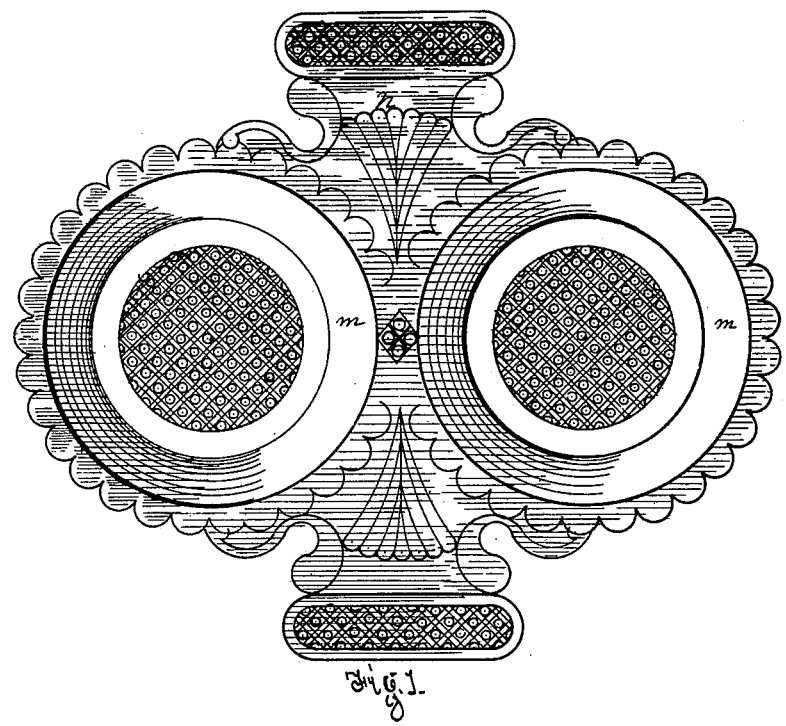
Figure 2:
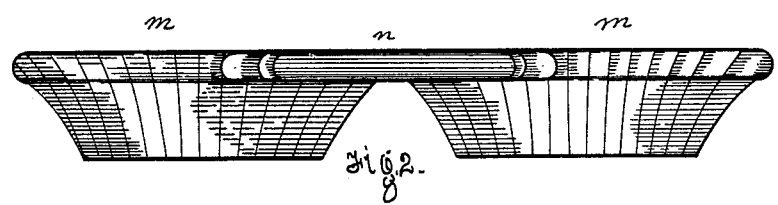
Figure 3:
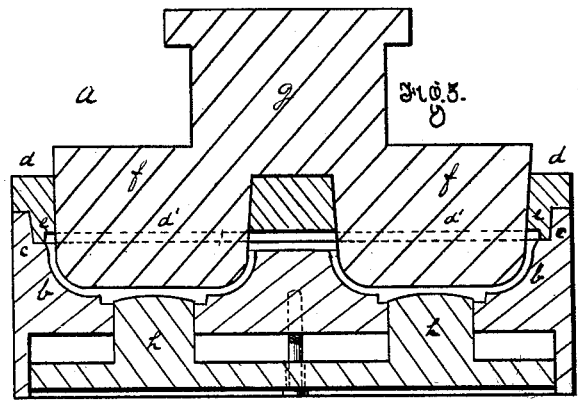

Figure 1 is a plan view of my improved glass dish. Fig. 2 is an edge view of the same. Fig. 3 is a sectional view of the molds and plungers.

Like letters of reference indicate like parts in each.

My invention consists of a glass article having one or more dishes connected by a horizontal glass web or diaphragm at or near the upper edge thereof, and also in the apparatus by which the same is made.

I will now describe my invention, so that others skilled in the art may manufacture and use the same.

The mold $a$ is provided with two or more cavities, $b\ b$, and a shallow cavity or depression, $c$, in which are formed the dishes $m\ m$, with their intervening web or diaphragm $n$. The ring $d$, which fits over and forms the upper portion of the mold, has a depression, $e$, on its lower face, which shapes the upper surface of the web $n$.

Over the cavities $b\ b$ are two holes or openings, $d'\ d'$, in the ring $d$ for the passage of the plungers $f\ f$, said plungers being connected by a bar or plate, $g$, to the same press, are worked together by one and the same motion. The mold is provided with the usual piston devices $h\ h$ for freeing the article after it has set in the mold.

The cavities $b\ b$, depressions $c$ and $e$, and plungers $f\ f$ may be made of any design or shape suitable for the purpose for which they are intended, and, if desired, one cavity and plunger may be of one design while the other cavity and plunger are of a different design.

The ring $d$ being placed over and on the lower portion of the mold, a sufficient quantity of molten glass is placed in each of the cavities $b\ b$, through the openings or holes $d'\ d'$, and pressed in the usual way by the plungers $f\ f$, which cause the plastic glass to spread out and fill the depression $c\ e$. The result is a glass article having two or more dishes, $m$, connected by an intervening web of glass, $n$, at the upper edge of said dishes. At the same time handles $o$ may be formed by extending the web-cavity $c\ e$.

The number of dishes may be increased by providing the mold with additional cavities and plungers similar to those which have been described.

The article thus produced is suitable to be used for pickles, preserves, strawberries, and ice-cream, and other purposes, and has a handsome and ornamental appearance.

Having thus described my invention, what I claim, and desire to secure by Letters Patent, is—

1. A glass article having two or more dishes connected at or about their upper edges by a web of glass, substantially as described.

2. A glass mold having two or more vertical cavities joined by a transverse cavity, and a single ring having two or more holes, in combination with a press having two or more plungers, substantially as and for the purpose described.

In testimony whereof I, the said HENRY FRANZ, have hereunto set my hand.

HENRY FRANZ.

Witnesses:
A. C. JOHNSTON,
J. K. SMITH.